US012024383B2

(12) United States Patent
Kazama

(10) Patent No.: US 12,024,383 B2
(45) Date of Patent: Jul. 2, 2024

(54) SHEET GUIDE, SHEET CONVEYOR, SHEET STACKER, AND PRINTER

(71) Applicant: Ikumi Kazama, Kanagawa (JP)

(72) Inventor: Ikumi Kazama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 13 days.

(21) Appl. No.: 17/325,556

(22) Filed: May 20, 2021

(65) Prior Publication Data

US 2021/0395033 A1 Dec. 23, 2021

(30) Foreign Application Priority Data

Jun. 23, 2020 (JP) ................................ 2020-107862

(51) Int. Cl.
*B65H 29/04* (2006.01)
*B41J 13/00* (2006.01)
*B65H 29/00* (2006.01)

(52) U.S. Cl.
CPC ........ *B65H 29/005* (2013.01); *B41J 13/0045* (2013.01)

(58) Field of Classification Search
CPC ...... B65H 2404/343; B65H 2404/3421; B65H 2404/342; B65H 2404/34; B65H 2404/313; B65H 2405/5812; B65H 2405/57; B65H 29/06; B65H 29/02; B65H 29/005; B65H 2301/44712; B65H 2301/4354; B65H 29/28; B65H 29/10; B65H 29/048; B65H 29/047; B65H 29/045; B65H 29/041; B65H 29/04; B65H 29/003; B65H 29/14; B65H 29/125; B65H 29/54; B65G 17/42; B65G 17/34; B65G 17/12
See application file for complete search history.

(56) References Cited

U.S. PATENT DOCUMENTS 2,997,157 A * 8/1961 Siebke ................. B65H 29/003
198/803.1
3,266,796 A * 8/1966 Haney ....................... B07C 3/08
271/265.01
4,203,590 A * 5/1980 Blessing ............. B65H 29/048
271/265.01
9,840,389 B2 * 12/2017 Lewalski ............... B65H 29/04
2017/0320694 A1 11/2017 Lewalski et al.
2020/0130978 A1 4/2020 Tamura
2020/0299093 A1 9/2020 Tamura

FOREIGN PATENT DOCUMENTS

JP H02-070651 A 3/1990
JP 2006-089178 A 4/2006
JP 2010-168218 8/2010
JP 2017-222510 A 12/2017
JP 2019-182655 10/2019

OTHER PUBLICATIONS

Office Action dated Feb. 20, 2024 issued in corresponding Japanese Patent Application No. 2020-107862.

* cited by examiner

*Primary Examiner* — Thomas A Morrison
(74) *Attorney, Agent, or Firm* — Harness, Dickey & Pierce, P.L.C.

(57) ABSTRACT

A sheet guide includes an endless belt, and a guide supported by a plurality of places of the endless belt, the guide configured to hold a downstream end of the sheet in a conveyance direction of the sheet, wherein the endless belt is configured to rotate to move the sheet held by the guide in the conveyance direction.

20 Claims, 4 Drawing Sheets

SHEET GUIDE, SHEET CONVEYOR, SHEET STACKER, AND PRINTER

CROSS-REFERENCE TO RELATED APPLICATION

This patent application is based on and claims priority pursuant to 35 U.S.C. § 119(a) to Japanese Patent Application No. 2020-107862, filed on Jun. 23, 2020, in the Japan Patent Office, the entire disclosures of which is hereby incorporated by reference herein.

BACKGROUND

Technical Field

Aspects of the present disclosure relate to a sheet guide, a sheet conveyor, a sheet stacker, and a printer.

Related Art

A sheet stacker includes an ejection roller and a gripper. The ejection roller sandwiches and ejects the sheet. The gripper holds a downstream end of the sheet. The gripper is fixed to a belt at a single fulcrum. A moving speed of the gripper is made faster than an ejection speed of the sheet so that the sheet is separated from the gripper.

SUMMARY

In an aspect of this disclosure, A sheet guide includes an endless belt, and a guide supported by a plurality of places of the endless belt, the guide configured to hold a downstream end of the sheet in a conveyance direction of the sheet, wherein the endless belt is configured to rotate to move the sheet held by the guide in the conveyance direction.

In another aspect of this disclosure, a sheet stacker includes an endless belt configured to rotate in a circumferential direction of the endless belt, a guide supported by a plurality of places of the endless belt, the guide configured to hold a downstream end of the sheet in a conveyance direction of the sheet along at least one of the circumferential direction, a stack part on which the sheet conveyed by the endless belt is to be stacked, and multiple holding parts configured to fix the guide at plurality of places of the endless belt, wherein at least one of the multiple holding parts is displaceable in the circumferential direction.

BRIEF DESCRIPTION OF THE SEVERAL VIEWS OF THE DRAWINGS

The aforementioned and other aspects, features, and advantages of the present disclosure will be better understood by reference to the following detailed description when considered in connection with the accompanying drawings, wherein.

Figure 1:
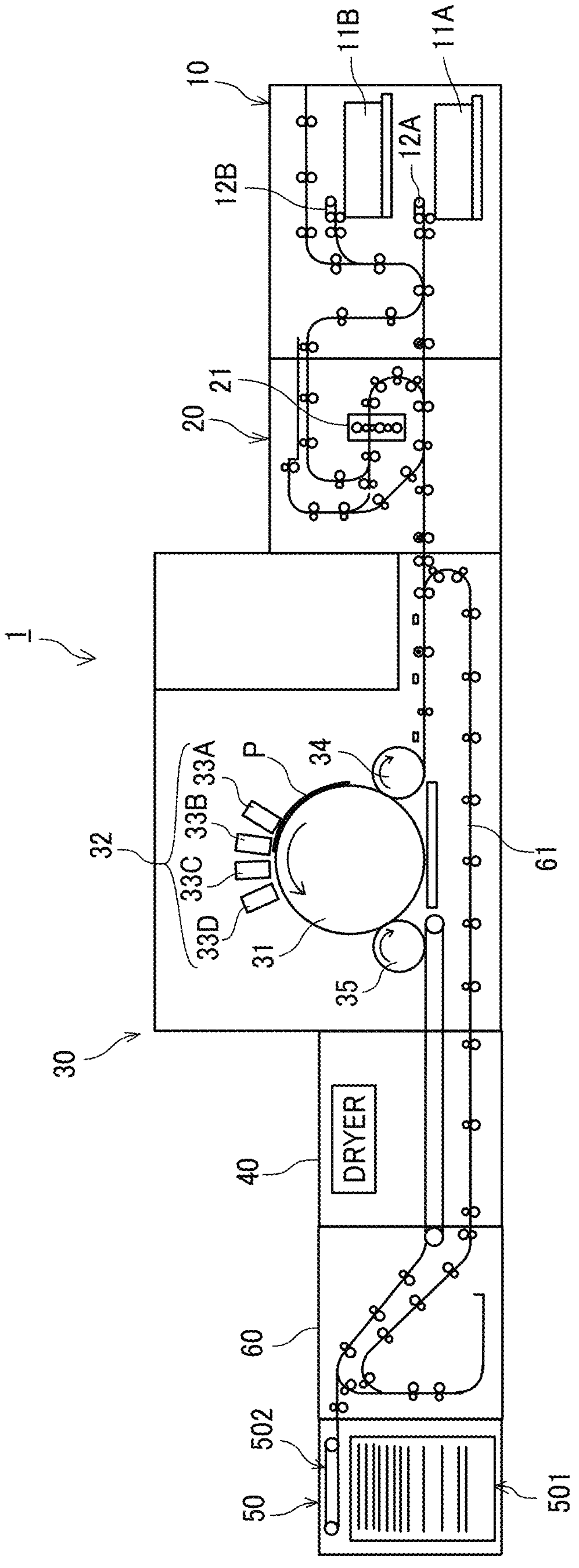
FIG. 1 is a schematic cross-sectional side view of a printer as a liquid discharge apparatus according to a first embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the disclosure and all of the components or elements described in the embodiments of this disclosure are not necessarily indispensable. As used herein, the singular forms “a,” “an,” and “the” are intended to include the plural forms as well, unless the context clearly indicates otherwise.

Referring now to the drawings, wherein like reference numerals designate identical or corresponding parts throughout the several views, embodiments of the present disclosure are described below. First, a printer 1 as a liquid discharge apparatus according to a first embodiment of the present disclosure is described with reference to FIG. 1.

FIG. 1 is a schematic cross-sectional side view of the printer according to the first embodiment of the present disclosure.

A printer 1 according to the first embodiment includes a loading unit 10 to load a sheet P into the printer 1, a pretreatment unit 20, a printing unit 30, a dryer 40, and an ejection unit 50, and a reverse mechanism 60.

In the printer 1, the pretreatment unit 20 applies, as required, pretreatment liquid onto the sheet P fed (supplied) from the loading unit 10, the printing unit 30 applies liquid to the sheet P to perform required printing, the dryer 40 dries the liquid adhering to the sheet P. and the sheet P is ejected to the ejection unit 50. The pretreatment unit 20 serves as a “pretreatment device”.

The loading unit 10 includes loading trays 11 (a lower loading tray 11A and an upper loading tray 11B) to accommodate a plurality of sheets P and feeding devices 12 (a feeding device 12A and a feeding device 12B) to separate and feed the sheets P one by one from the loading trays 11, and supplies the sheets P to the pretreatment unit 20.

The pretreatment unit 20 includes, e.g., a coater 21 as a treatment-liquid application unit that coats a printing surface of the sheet P with a treatment liquid having an action and an effect of aggregation of colorant of ink to prevent bleed-through.

The printing unit 30 includes a drum 31 and a liquid discharge unit 32. The drum 31 is a bearer (rotating member) that bears the sheet P on a circumferential surface of the drum 31 and rotates. The liquid discharge unit 32 discharges a liquid toward the sheet P borne on the drum 31.

The printing unit 30 further includes transfer cylinders 34 and 35. The transfer cylinder 34 receives the sheet P from the pretreatment unit 20 and forwards the sheet P to the drum 31. The transfer cylinder 35 receives the sheet P conveyed by the drum 31 and forwards the sheet P to the dryer 40.

The transfer cylinder 34 includes a sheet gripper to grip a leading end of the sheet P conveyed from the pretreatment unit 20 to the printing unit 30. The sheet P thus gripped by the transfer cylinder 34 is conveyed as the transfer cylinder 34 rotates. The transfer cylinder 34 forwards the sheet P to the drum 31 at a position opposite (facing) the drum 31.

Similarly, the drum 31 includes a sheet gripper on a surface of the drum 31, and the leading end of the sheet P is gripped by the sheet gripper of the drum 31. The drum 31 includes a plurality of suction holes dispersed on a surface of the drum 31 and a suction unit generating suction airflows directed from desired suction holes of the drum 31 to an interior of the drum 31.

The sheet gripper of the drum 31 grips the leading end of the sheet P forwarded from the transfer cylinder 34 to the drum 31, and the sheet P is attracted to and borne on the drum 31 by the suction airflows by the suction device. As the drum 31 rotates, the sheet P is conveyed.

The liquid discharge unit 32 includes discharge units 33 (discharge units 33A to 33D) as liquid dischargers to discharge liquids. For example, the discharge unit 33A discharges a liquid of cyan (C), the discharge unit 33B discharges a liquid of magenta (M), the discharge unit 33C discharges a liquid of yellow (Y), and the discharge unit 33D discharges a liquid of black (K). Further, a discharge unit 33 may discharge a special liquid, that is, a liquid of spot color such as white, gold, or silver.

The printing unit 30 controls a discharge operation of each discharge unit 33 of the liquid discharge unit 32 by a drive signal corresponding to print data. When the sheet P borne on the drum 31 passes through a region facing the liquid discharge unit 32, the liquids of respective colors are discharged from the discharge units 33 toward the sheet P, and an image corresponding to the print data is printed on the sheet P.

The dryer 40 dries the liquid adhered onto the sheet P by the printing unit 30. Thus, a liquid component such as moisture in the liquid evaporates, and the colorant contained in the liquid is fixed on the sheet P. Additionally, curling of the sheet P is restrained.

The reverse mechanism 60 reverses, in switchback manner, the sheet P that has passed through the dryer 40 in double-sided printing. The reversed sheet P is fed back to an upstream side of the transfer cylinder 34 through a conveyance passage 61 of the printing unit 30.

The ejection unit 50 is constituted by a sheet stacker according to the present embodiment. The ejection unit 50 includes a stack part 501 on which a plurality of sheet P are loaded, and a sheet conveyor 502. The plurality of sheets P conveyed through the reverse mechanism 60 is sequentially stacked and held on the stack part 501.

Next, a sheet guide 503, a sheet conveyor 502, and a sheet stacker 500 including the sheet conveyor 502 according to the first embodiment of the present disclosure are described with reference to FIG. 2.

Figure 2:
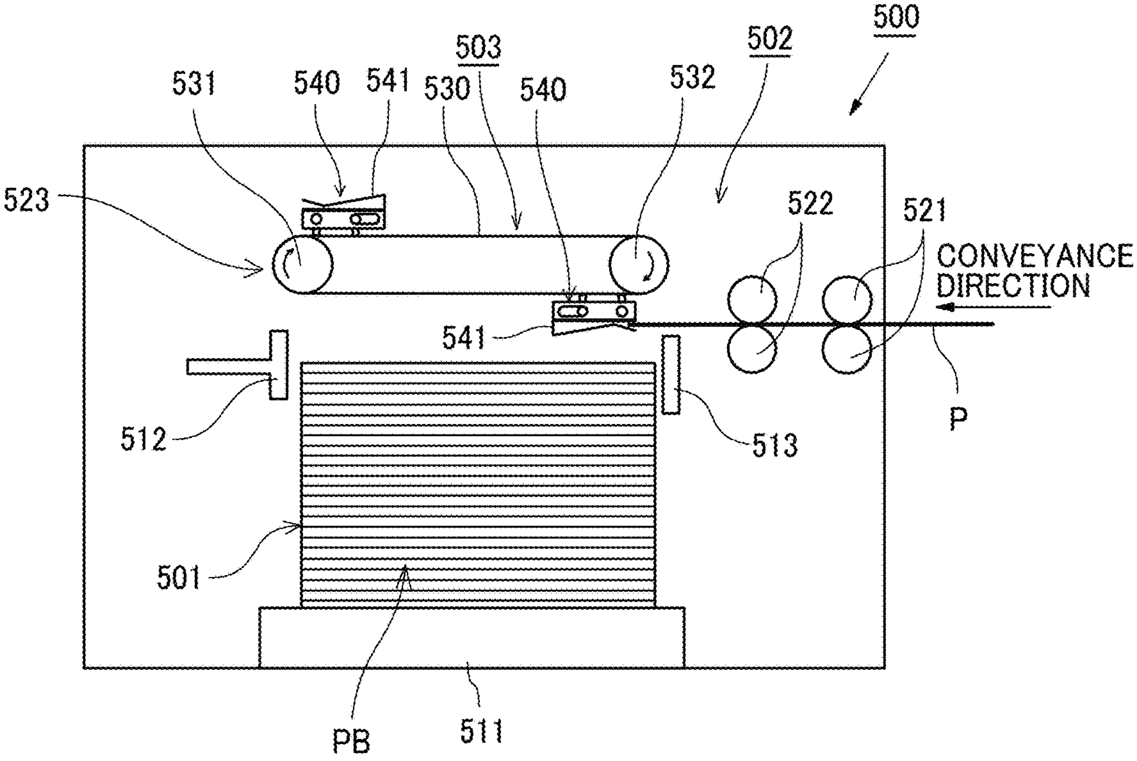
FIG. 2 is a schematic cross-sectional side view of a sheet guide, and a sheet stacker including a sheet conveyor according to the first embodiment of the present disclosure.

FIG. 2 is a schematic cross-sectional side view of the sheet stacker 500 according to the first embodiment of the present disclosure.

The sheet stacker 500 includes the stack part 501 and the sheet conveyor 502. The stack part 501 is a sheet stacking portion on which a sheet bundle PB is stacked. The sheet conveyor 502 conveys the sheet P toward the stack part 501.

The stack part 501 includes a table 511, a leading end fence 512 (sheet jogger), a trailing end fence 513, and side fences on both sides of the stack part 501. The sheet bundle PB is stacked on the table 511. The side fences are disposed on opposite sides in a direction perpendicular to a conveyance direction of the sheet P indicated by arrow in FIG. 2.

The sheet conveyor 502 includes conveyance rollers 521 and 522 and a guide device 523. The conveyance rollers 521 and 522 convey the sheet P fed from the reverse mechanism 60. The guide device 523 includes a sheet guide 503 according to the first embodiment of the present disclosure.

The guide device 523 receives a leading end (downstream end) of the sheet P conveyed from the conveyance rollers 522 toward the stack part 501, and guides the sheet P to a downstream of the conveyance rollers 522 in the conveyance direction of the sheet P.

The guide device 523 includes an endless belt 530 and guide parts 541. The endless belt 530 is wound around a drive roller 531 and a driven roller 532. The guide parts 541 are attached to the belt 530.

In the guide device 523, the belt 530 rotates (orbits) around the drive roller 531 and the driven roller 532 in a clockwise direction after an elapse of a predetermined period of time from a timing of detection of the sheet P at an upstream of the conveyance rollers 522.

Then, the leading end of the sheet P is inserted into the guide part 541 due to a difference between a linear velocity of the guide parts 541 and a linear velocity of the conveyance roller 522. For example, the linear velocity of the guide parts 541 is smaller than the linear velocity of the conveyance rollers 522.

Then, as the belt 530 rotates around the drive roller 531 and the driven roller 532 in a clockwise direction, the guide parts 541 moves to the downstream in the conveyance direction of the sheet P (leftward direction in FIG. 2) while holding the leading end of the sheet P to guide the sheet P.

Here, the guide part 541 has a gap greater than a thickness of the sheet P to receive the leading end of the sheet P. The guide part 541 does not have a gripping force to grip the sheet P, and the leading end of the sheet P is merely inserted into the guide part 541. The guide part 541 has a function of guiding the leading end of the sheet P. The guide part 541 also has a function of reducing flapping of the sheet P in a part of the sheet P from the leading end to a middle portion of the sheet P. The guide part 541 may include a clip having a gripping force for gripping the leading end of the sheet P.

When the guide part 541 reaches a guide end position, a linear velocity of the guide part 541 is set higher than a linear velocity of the conveyance rollers 522. Thus, the leading end of the sheet P is separated from the guide part 541 and falls onto the stack part 501 to be stacked (loaded).

Next, a guide device 523 according to the first embodiment is described with reference to FIGS. 3 to 5.

Figure 3:
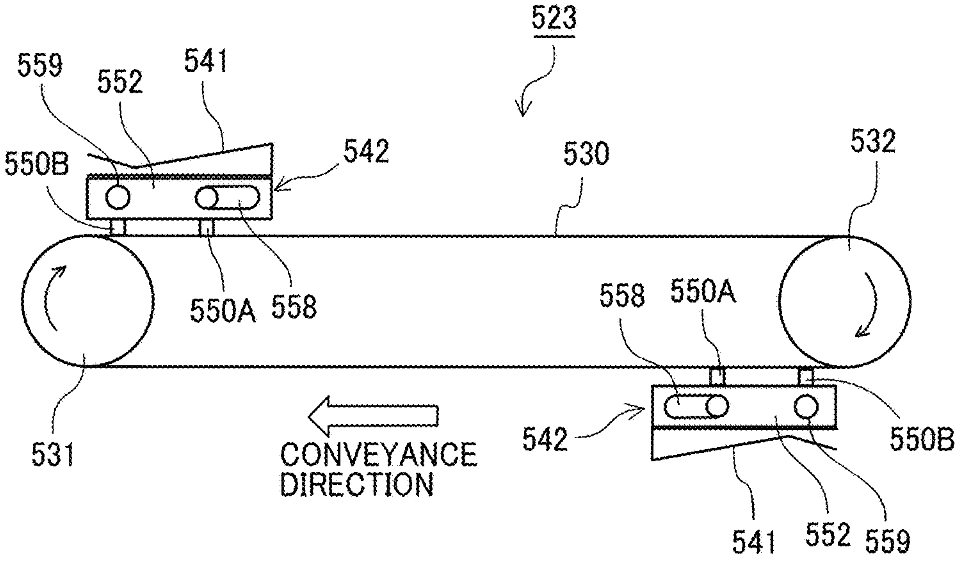
FIG. 3 is a schematic cross-sectional side view of a guide device according to the first embodiment of the present disclosure.

FIG. 3 is a schematic cross-sectional side view of the guide device 523 according to the first embodiment of the present disclosure.

Figure 4:
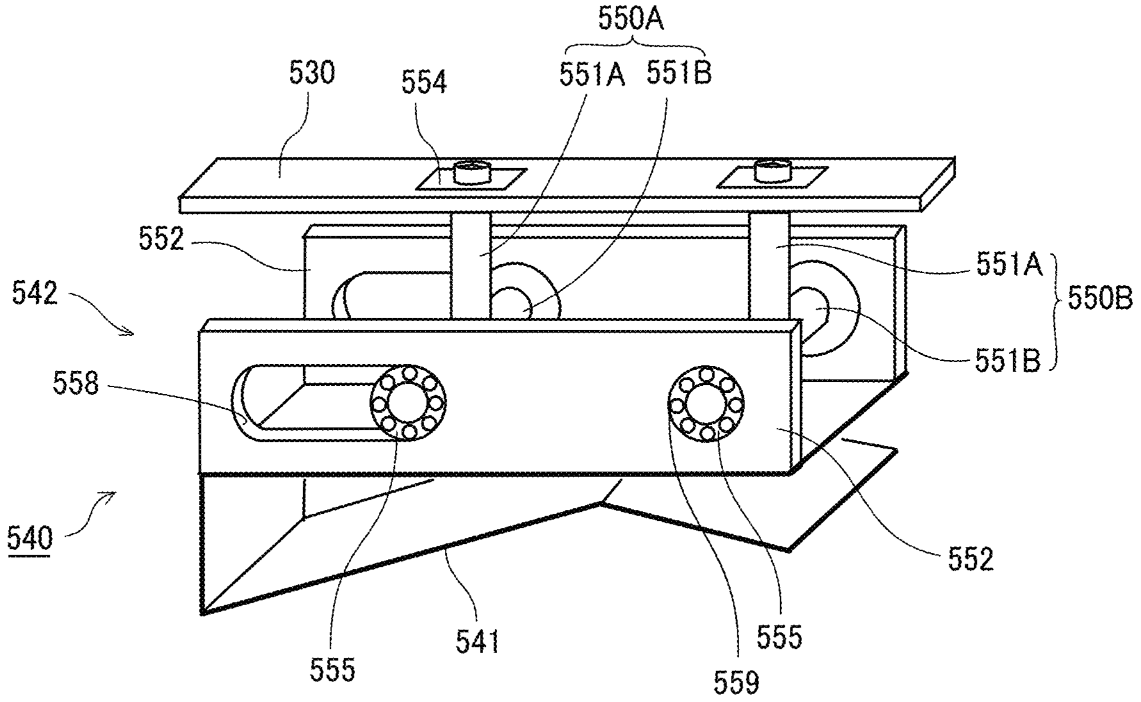
FIG. 4 is an external perspective view of a main portion the guide device according to the first embodiment of the present disclosure.

FIG. 4 is an external perspective view of a main portion the guide device 523 according to the first embodiment of the present disclosure.

Figure 5:
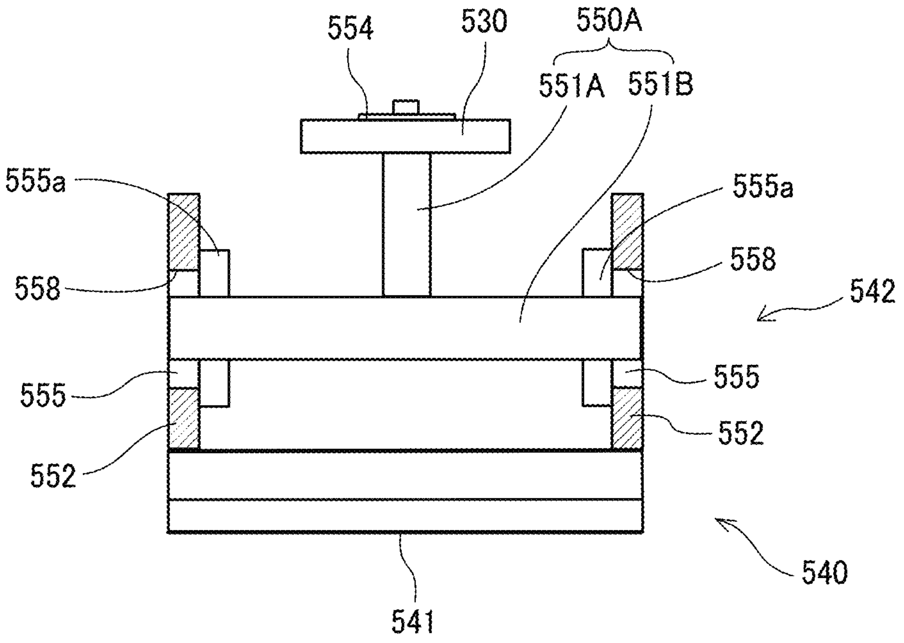
FIG. 5 is a schematic cross-sectional front view of the guide device according to the first embodiment of the present disclosure.

FIG. 5 is a schematic cross-sectional front view of the guide device 523 according to the first embodiment of the present disclosure.

As described above, the guide device 523 includes the endless belt 530 and the guide part 541. The belt 530 rotates around the drive roller 531 and the driven roller 532 in the clockwise direction. The guide part 541 is attached to the belt 530 and holds a downstream end (leading end) of the sheet P in the conveyance direction of the sheet P.

The belt 530 is wound around a drive roller 531 and a driven roller 532. The belt rotates around the drive roller 531 and driven roller 532 in the clockwise direction as indicated by small arrow in the drive roller 531 and the driven roller 532 in FIG. 3. In a lower part of the belt 530, a moving direction of the belt 530 is in the conveyance direction of the sheet P (leftward direction) as indicated by large arrow in FIG. 3. The guide parts 541 are attached to the belt 530 at two points via attachment parts 542.

The guide part 541 and the attachment part 542 form the guide 540 that holds the downstream end (leading end) of the sheet P. Thus, the guide 540 is attached to the belt 530 at plural places (two places).

The attachment part 542 is interposed between the guide part 541 and the belt 530. The attachment part 542 includes two holding parts 550 (550A and 550B) and a support 552. The holding parts 550 are arranged apart from each other in a circumferential direction of the belt 530 (conveyance direction of the sheet P). The support 552 attached to both ends of the guide part 541 in a width direction of the belt 530 (depth direction in FIG. 3). The width direction of the belt 530 is perpendicular to the conveyance direction of the sheet P.

The conveyance direction of the sheet P is along at least one of the circumferential direction of the belt 530. For example, the conveyance direction of the sheet P (leftward direction in FIG. 3) is along the circumferential direction (rotational direction) of lower part of the belt 530 as illustrated in FIG. 3. The guide device 523 convey the sheet P in a lower part of the belt 530. However, the guide device 523 does not convey the sheet P in an upper part of the belt 530.

The guide part 541 is supported by a plurality of places of the belt 530. The guide part 541 holds a downstream end of the sheet P in the conveyance direction. The attachment part 542 includes poles 551A fixed to the plurality of places of the endless belt 530, and the guide part 541 is fixed to the attachment part 542. The holding part 550 includes the poles 551A, one end of which are fixed to the belt 530 and shafts 551B fixed to another end of the poles 551A.

The support 552 is made of a slidable material such as polyacetal (POM) material, polyamide (PA), polytetrafluoroethylene (PTFE), or polyphenylene sulfide (PPS). Further, the support 552 may also be formed together with the guide part 541 as one body.

As illustrated in FIG. 4, each of two holding parts 550A and 550B includes a pole 551A and a shaft 551B. One end of the pole 551A is fixed to the belt 530. The shaft 551B is fixed to another end of the pole 551A and extends in the width direction of the belt 530.

One end of the pole 551A of the holding part 550 is fixed to the belt 530 by a washer 554 for expanding a seat area. The washer 554 for expanding the seat area reduces an inclination of the holding part 550.

Both ends of the shaft 551B are respectively connected to the supports 552 via the bearings 555. The shaft 551B becomes another end of the holding part 550. The bearings 555 respectively include flanges 555*a* as illustrated in FIG. 5.

As illustrated in FIGS. 4 and 5, the support 552 includes an elongated hole 558 and a round hole 559. Both ends of the shaft 551B of one of the holding part 550A are movably fitted into the elongated hole 558 of the support 552 via the bearing 555 (see left shaft 551B in FIG. 4). Both ends of the shaft 551B of another of the holding part 550B are fitted into the round hole 559 of the support 552 via the bearing 555 (see right shaft 551B in FIG. 4).

The left shaft 551B in FIG. 4 of one of the holding part 550A is movably fitted into the elongated hole 558 of the support 552. The shaft 551B is disposed close to another end (left end) of the guide part 541 in FIG. 4. Thus, the shaft 551B is coupled to the support 552 such that the shaft 551B is displaceable with respect to the support 552 and the guide part 541 in the circumferential direction of the belt 530. The support 552 is attached to the guide part 541.

Next, an effect of the guide device 523 according to the first embodiment is described with reference also to FIG. 6.

Figure 6:
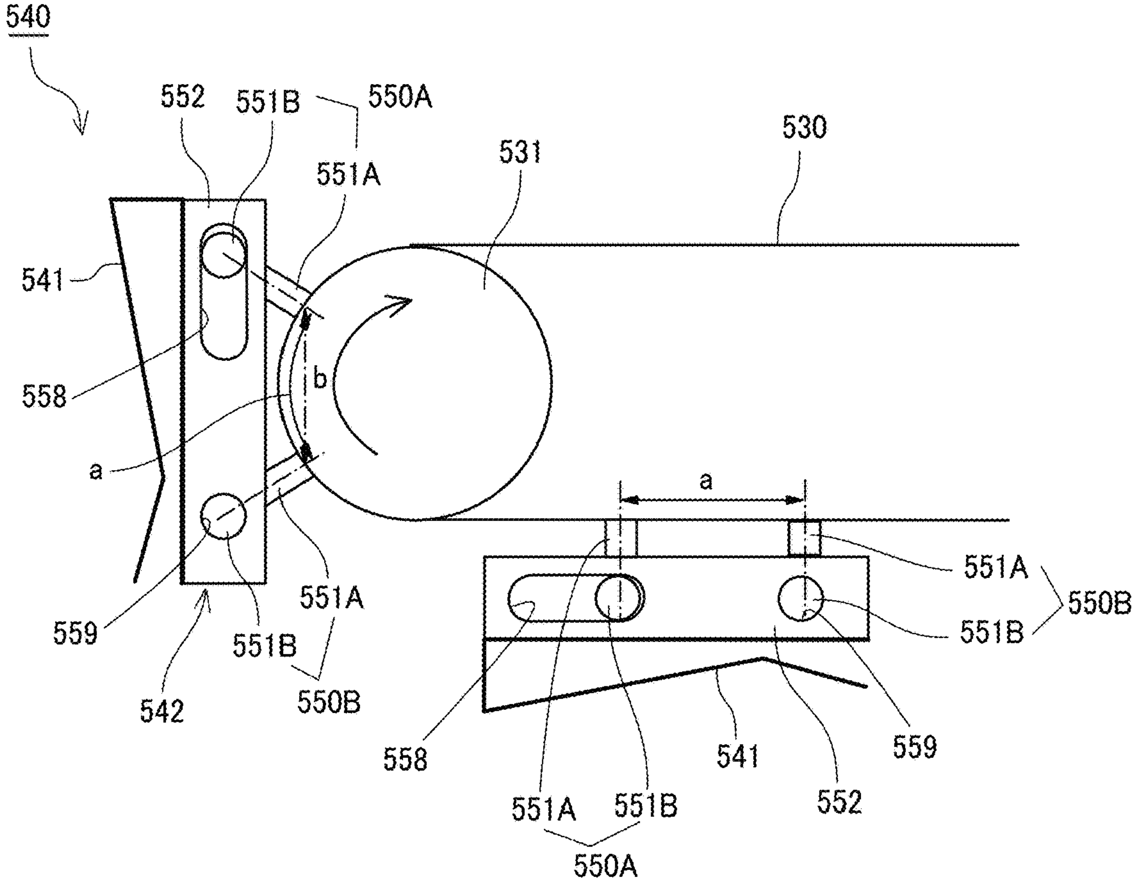
FIG. 6 is a schematic cross-sectional side view of the guide device illustrating an effect of the guide device according to the first embodiment of the present disclosure.

FIG. 6 is a schematic cross-sectional side view of the guide device 523 illustrating an effect of the guide device 523 according to the first embodiment.

The guide device 523 in the first embodiment includes the guide part 541 attached to the belt 530 by two holding parts 550. That is, the guide parts 541 are attached to the belt 530 at multiple places. Thus, posture of the guide part 541 is stabilized, and the guide part 541 can stably guide the sheet P.

Two holding parts 550 are arranged with an interval (spaced apart) in the circumferential direction of a movement of the belt 530. The interval (linear distance) between two holding parts 550 at side ends of the belt 530 differs between when the holding part 550 moves a linear part (straight part) and when the holding part 550 moves a peripheral surfaces (round part) of the drive roller 531 and the driven roller 532.

For example, as illustrated in FIG. 6, an interval "b" when two holding parts 550A and 550B move the peripheral surface of the drive roller 531 (round part) is shorter than an interval "a" w % ben two holding parts 550A and 550B move the linear part (straight part).

Thus, the belt 530 wound around rollers (drive roller 531 and driven roller 532) has the linear part between the rollers and the round part in a periphery of the rollers, and the interval "b" between two of the multiple holding parts 550A and 550B moving the round part is shorter than the interval "a" between two of the multiple holding parts 550A and 550B moving the linear part as illustrated in FIG. 6.

If both of the two holding parts 550 are fixed to the guide parts 541, the belt 530 and the two holding parts 550 may not rotate together with the guide part 541 around the drive roller 531 and the driven roller 532. If both of the two holding parts 550 are fixed to the guide parts 541, the two holding parts 550 may rotate around the drive roller 531 and the driven roller 532 while generating a vibration so that the sheet guide 503 may not stably guide the sheet P.

Thus, the sheet guide 503 in the first embodiment includes the holding part 550 so that the shaft 551B of one of the holding part 550A of the two holding parts 550 is fitted and coupled to the elongated hole 558 of the support 552. Thus, the shaft 551B is movable in the circumferential direction of the belt 530 along the elongated hole 558 of the support 552. That is, another end of one of holding part 550A is displaceable with respect to the guide part 541 in the circumferential direction of the belt 530.

Thus, another end of at least one of the multiple holding parts 550A is displaceably coupled to the support 552 in the circumferential direction of the belt 530.

Therefore, the sheet guide 503 can change the interval (distance) between two holding parts 550A and 550B at the guide part 541 side.

Thus, an end (shaft 551B) of the holding part 550A on the guide part 541 side displaces when the guide part 541 moves in a part corresponding to the peripheral surface of the drive roller 531 or the driven roller 532 as illustrated in FIG. 6, for example.

Therefore, the interval (distance) between the two holding parts 550A and 550B at the guide part 541 side increases. Since the end (shaft 551B) of the holding part 550A and 550B on the guide part 541 side displaces so that the interval between the shaft 551B in the elongated hole 558 and the shaft 551B in the round hole 559 widens (increases), the guide part 541 can smoothly rotates with the belt 530 around the drive roller 531 and the driven roller 532 without applying a load on the belt 530 and the guide part 541.

The sheet guide 503 according to a second embodiment of the present disclosure is described with reference to FIG. 7.

Figure 7:
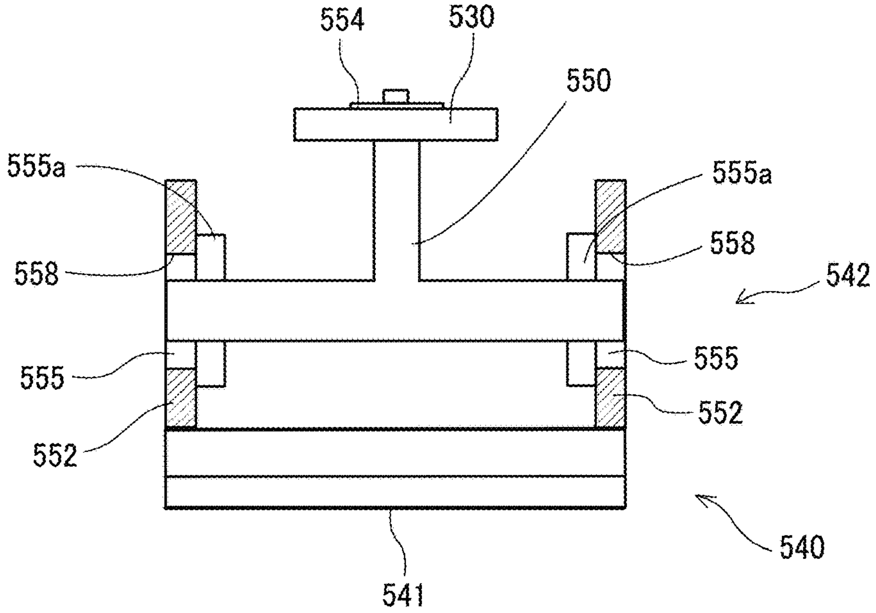
FIG. 7 is a schematic cross-sectional front view of the guide device of the sheet guide according to a second embodiment of the present disclosure.

FIG. 7 is a schematic cross-sectional front view of the sheet guide 503 according to the second embodiment of the present disclosure.

The guide device 523 in the second embodiment includes the holding part 550 that includes the pole 551A and the shaft 551B formed in a single body. Thus, the guide device 523 can reduce a number of parts in the guide device 523.

Note that the printing unit 30 of the printer 1 in each of the above-described embodiments may fix toners onto the sheet P to perform a desired printing operation to the sheet P instead of discharging liquid such as ink onto the sheet P to perform desired printing operation.

A material of the sheet P to be conveyed is not limited to a (regular) paper, and the sheet guide according to the present embodiment may also be applied to an apparatus to convey a plastic film, cloth, metal sheet, and the like.

Numerous additional modifications and variations are possible in light of the above teachings. It is therefore to be understood that, within the scope of the above teachings, the present disclosure may be practiced otherwise than as specifically described herein. With some embodiments having thus been described, it is obvious that the same may be varied in many ways. Such variations are not to be regarded as a departure from the scope of the present disclosure and appended claims, and all such modifications are intended to be included within the scope of the present disclosure and appended claims.

What is claimed is:

1. A sheet guide comprising:
an endless belt; and
a guide supported at a plurality of places of the endless belt, the guide configured to hold a downstream end of a sheet in a conveyance direction of the sheet, the guide including multiple holding parts configured to fix the guide to the endless belt at the plurality of places,
wherein at least one of the multiple holding parts is slidably displaceable relative to the guide, a direction of the displacement including only a linear direction relative to the guide in a guide conveyance direction at all positions of the guide along a path of the endless belt, and
wherein the endless belt is configured to rotate to move the sheet held by the guide in the conveyance direction.

2. The sheet guide according to claim 1, wherein the guide includes:
a guide part configured to hold the downstream end of the sheet in the conveyance direction; and
an attachment part supported at the plurality of places of the endless belt,
wherein the guide part is fixed to the attachment part.

3. The sheet guide according to claim 2,
wherein the attachment part includes:
the multiple holding parts, one end of each holding part, of the multiple holding parts, being fixed to the endless belt; and
a support coupled to another end of each of the multiple holding parts and attached to the guide part,
wherein the multiple holding parts are apart from each other in the circumferential direction of the endless belt.

4. The sheet guide according to claim 3,
wherein each holding part of the multiple holding parts includes
a pole including one end fixed to the endless belt, and
a shaft fixed to another end of the pole,
wherein the support includes an elongated hole extending in the circumferential direction, and
the shaft of at least one of the multiple holding parts is movably fitted to the elongated hole.

5. The sheet guide according to claim 4, wherein each of the multiple holding parts further includes a bearing between the shaft and the support.

6. The sheet guide according to claim 5,
wherein the bearing includes a flange.

7. The sheet guide according to claim 3,
wherein the support is made of a slidable material.

8. The sheet guide according to claim 3,
Wherein each holding part, of the multiple holding parts, is fixed to the endless belt via a washer.

9. The sheet guide according to claim 3,
wherein the endless belt is wound around rollers and has a linear part between the rollers and a round part in a periphery of the rollers, and
an interval between two of the multiple holding parts moving at the round part is shorter than an interval between said two of the multiple holding parts moving at the linear part.

10. A sheet conveyor comprising:
the sheet guide according to claim 1; and
a conveyance roller upstream of the sheet guide, the conveyance roller configured to convey the sheet to the sheet guide in the conveyance direction.

11. The sheet conveyor of claim 10, wherein the conveyance roller is configured to convey the sheet at a linear speed greater than a linear speed of the sheet guide.

12. The sheet guide according to claim 1, wherein the guide is configured to hold the downstream end of the sheet without using a pinching force.

13. The sheet guide according to claim 1, wherein the guide is configured to hold the downstream end of the sheet using a gripping force on the sheet.

14. The sheet guide according to claim 4, wherein the support further includes a round hole, and
the shaft of at least one holding part, of the multiple holding parts, is fitted to the round hole via a bearing.

15. A sheet stacker comprising:
an endless belt configured to rotate in a circumferential direction of the endless belt;
a guide supported at a plurality of places of the endless belt, the guide configured to hold a downstream end of a sheet in a conveyance direction of the sheet along at least the circumferential direction;
a stack part on which the sheet conveyed by the endless belt is to be stacked; and multiple holding parts configured to fix the guide at the plurality of places of the endless belt, wherein at least one of the multiple holding parts is slidably displaceable relative to the guide, a direction of the displacement including only a linear direction relative to the guide in a guide conveyance direction at all positions of the guide along a path of the endless belt.

16. A printer comprising:

a liquid discharge unit configured to discharge a liquid on a sheet; and the sheet stacker according to claim 11, the sheet stacker configured to stack the sheet onto which the liquid is discharged by the liquid discharge unit.

17. The sheet stacker according to claim 15, further comprising a conveyance roller upstream of the sheet guide, the conveyance roller configured to convey the sheet to the sheet guide in the conveyance direction at a linear speed greater than a linear speed of the sheet guide.

18. The sheet stacker according to claim 15, wherein the guide is configured to hold the downstream end of the sheet without using a pinching force.

19. The sheet stacker according to claim 15, wherein the guide is configured to hold the downstream end of the sheet using a gripping force on the sheet.

20. The sheet stacker according to claim 15, wherein the guide includes:

a guide part configured to hold the downstream end of the sheet in the conveyance direction; and an attachment part supported at the plurality of places of the endless belt, the attachment part including a support coupled to an end of each of the multiple holding parts and attached to the guide part, wherein the support includes an elongated hole extending in the circumferential direction and a round hole, a first shaft of at least one holding part, of the multiple holding parts, being movably fitted to the elongated hole, and a second shaft of at least one holding part, of the multiple holding parts, being fitted to the round hole via a bearing.

* * * * *